July 18, 1933.  C. E. DUNLAP  1,918,838
PROCESS AND APPARATUS FOR BEVELING SQUARE TIRE PATCHES
Filed Feb. 12, 1932  4 Sheets-Sheet 1

Inventor
Clarence E. Dunlap
By Lynn H. Latta
Attorney

July 18, 1933.  C. E. DUNLAP  1,918,838
PROCESS AND APPARATUS FOR BEVELING SQUARE TIRE PATCHES
Filed Feb. 12, 1932  4 Sheets-Sheet 2

Inventor
Clarence E. Dunlap
Lynn H. Latta
By
Attorney

July 18, 1933.                C. E. DUNLAP                1,918,838
            PROCESS AND APPARATUS FOR BEVELING SQUARE TIRE PATCHES
                    Filed Feb. 12, 1932           4 Sheets-Sheet 4

Inventor
Clarence E. Dunlap.
By Lynn H. Latta
Attorney

Patented July 18, 1933

1,918,838

UNITED STATES PATENT OFFICE

CLARENCE E. DUNLAP, OF SIOUX CITY, IOWA

PROCESS AND APPARATUS FOR BEVELING SQUARE TIRE PATCHES

Application filed February 12, 1932. Serial No. 592,578.

My invention relates to an apparatus for forming a satisfactory beveled edge on rubber tire patches and has for its object to provide a superior method for forming such bevels.

A further object of my invention is to provide a method for forming a beveled edge on square tire patches without encountering difficulties usually set up by the inherent nature and characteristics of the rubber used.

Another object of my invention is to provide means for beveling square patches, which means will enable the patches to be cut from a lengthened strip, which will prevent waste of material usually encountered in simple blanking operations.

A further object of my invention is to provide such an apparatus which will function entirely automatically and will allow discharge of the finished square patches to a convenient receptacle.

A further object of my invention is to provide such a machine which will permit a shearing of the beveled edges, which shearing will take place automatically and in the proper sequence.

A further object of my invention is to provide such an apparatus which can be contained in a comparatively small space and at the same time perform its functions properly.

A further object of my invention is to perform the above mentioned objects with a machine which is of comparatively simple construction and which will operate satisfactorily without the incorporation of too many mechanical elements, which would tend to cause a breakdown in the machine.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figures 2, 3:
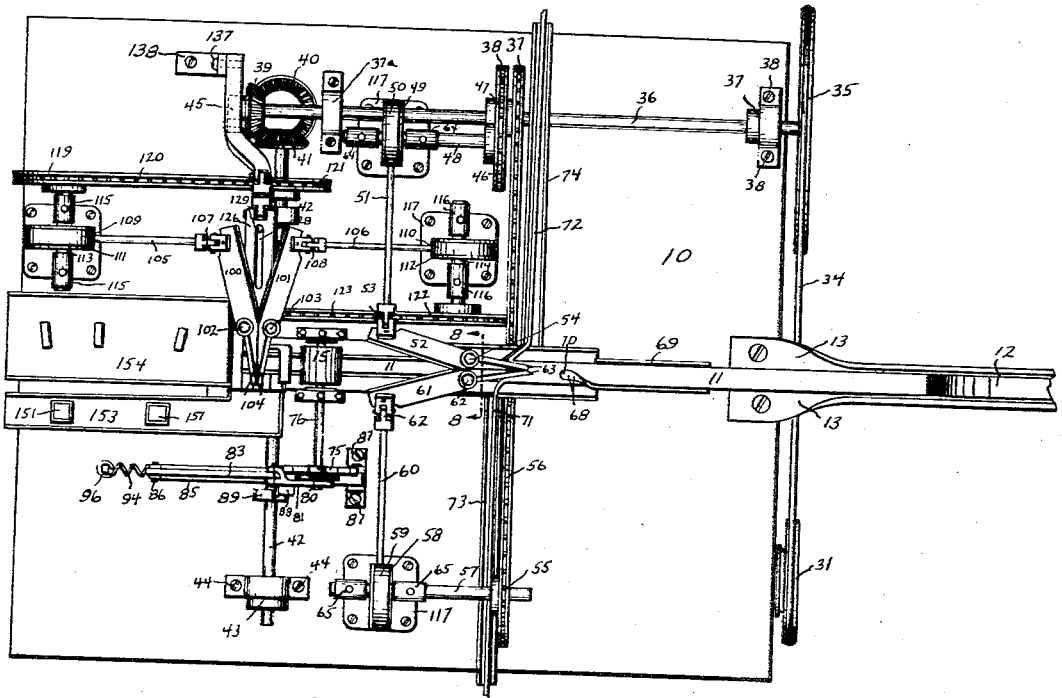
Figure 2 is a plan view of Figure 1.
Figure 4:
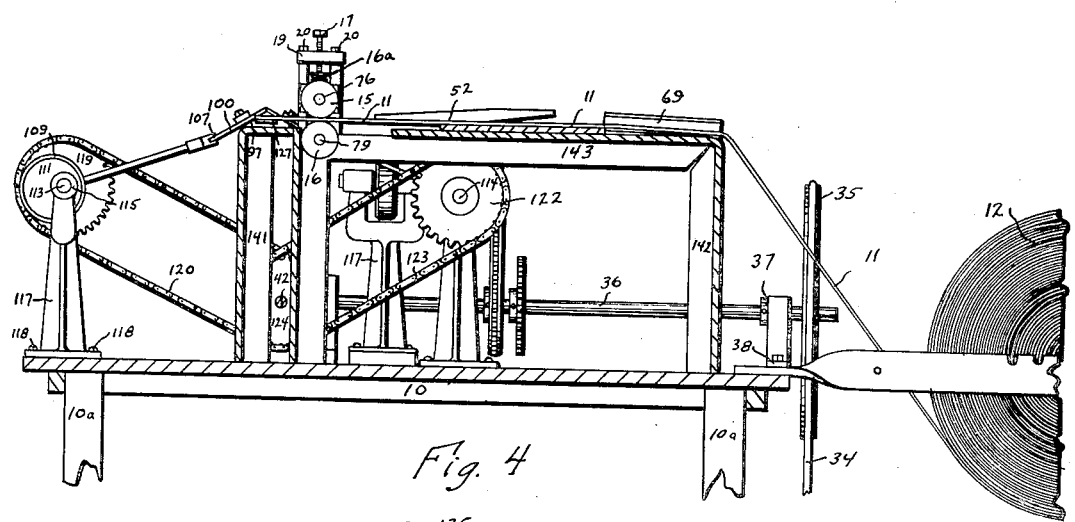
Figure 5:
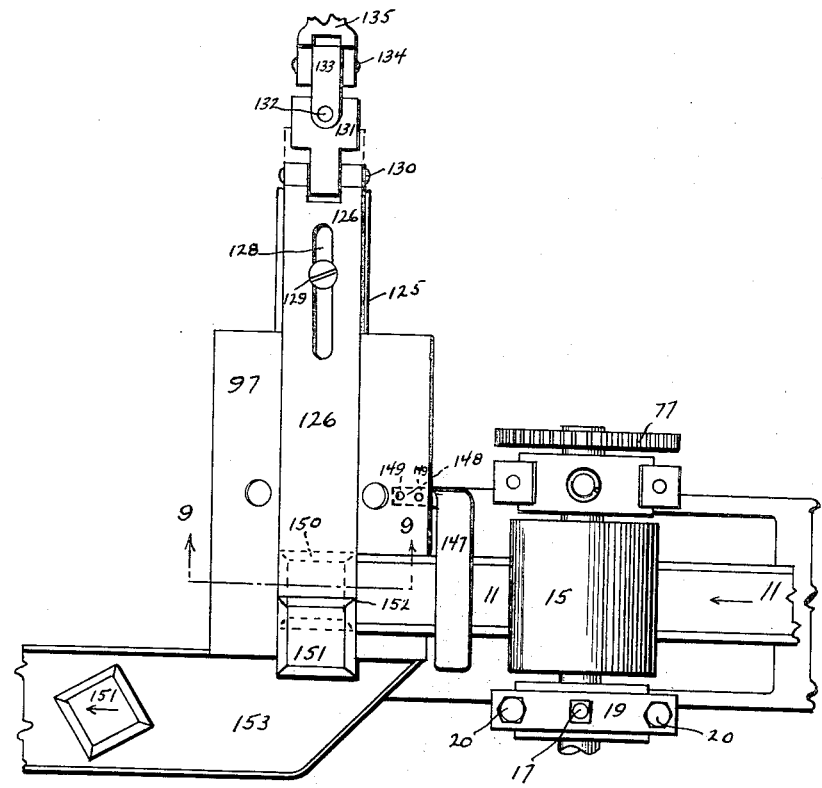
Figure 6:
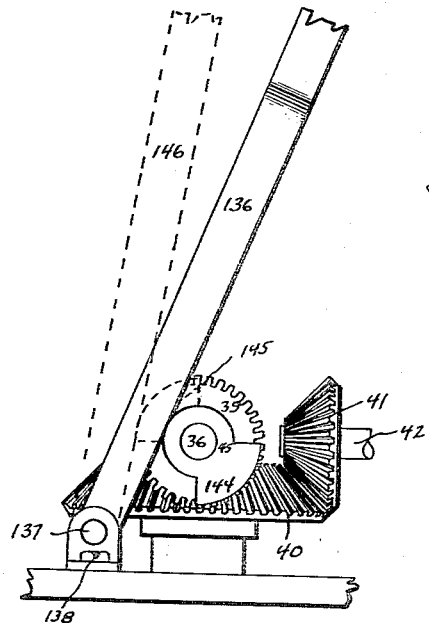
Figure 7:
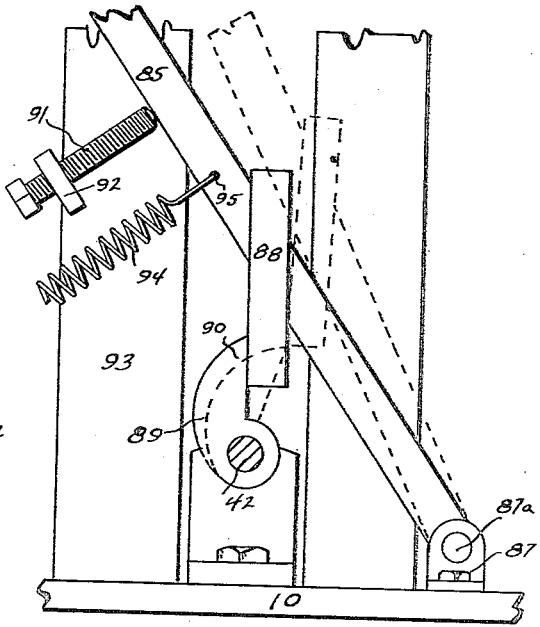
Figure 8:
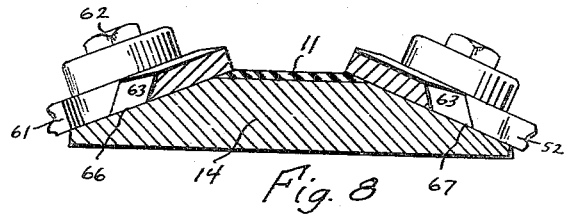
Figure 9:
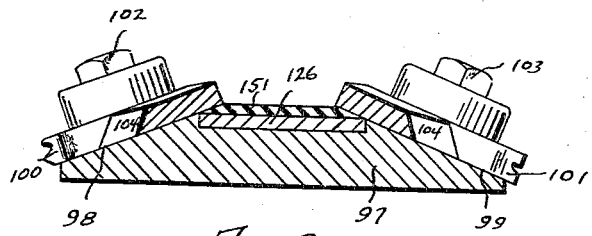

Figure 3 is a rear view of the machine looking towards the rear transverse shears, Figure 4 is a sectional view taken approximately along the line of the lengthened rubber strip, Figure 5 is a detail plan view of the rollers which feed the strip and the discharging mechanism, with the shears removed, Figure 6 is an enlarged detail view of the cam mechanism which guides the discharging mechanism, Figure 7 is an enlarged detail view of the cam mechanism for feeding the rubber strip, Figure 8 is a sectional view of Figure 2 along the lines 8—8, and Figure 9 is a sectional view of Figure 5 along the lines 9—9.

It must be stated here that rubber of that type used for tire patches especially, presents peculiar problems in its satisfactory working; for example to form a beveled edge on a square patch with a die or other such mechanism, would involve difficulties, since due to the inherent elasticity of the rubber, a complicated die would undoubtedly be necessary or if a simple die were used, it would undoubtedly produce an inferior beveled edge.

I have found through experiment that practically the only satisfactory way to form a beveled edge on a square patch is by providing a shearing force directly in the direction of the beveled surface. In order to accomplish this result, it will be seen that the best way to perform this function is to take an elongated rubber strip of rectangular cross section and provide shears parallel to its length, which shears will automatically and continuously shear the strip to provide a bevel on the strip's outer edges.

The next important function to be accomplished after the strip has been formed in this way, is to provide a shearing mechanism disposed directly at right angles to the former shears, which will shear the strip and form the bevel and completed patch at the same time.

While these functions are performed, it is important to keep the steps in proper sequence so that an exact square patch can be formed.

After the patch is completed, it is necessary to discharge the same in automatic sequence.

I will now proceed to explain how I have accomplished the above methods.

I have used the reference character 10 to designate the bed of the main working parts of my machine. This is a table top, which table includes the legs 10a.

The rubber strip is indicated by the character 11. This strip is fed from a reel 12 which is carried on the two brackets 13.

The rubber strip 11, which is rectangular in cross section passes over the bed plate 14 and between the rollers 15 and 16.

The roller 15 includes tensioning means which consists of the spring 16a, the screw 17 and the bracket 18 and the upper piece 19. The upper piece 19 is secured to the brackets 18 by means of the screws 20.

By turning the screw 17, the tension can be maintained against the rubber strip 11 as it passes between these rollers.

We will now pass to the powering mechanism for the device.

Figure 1:
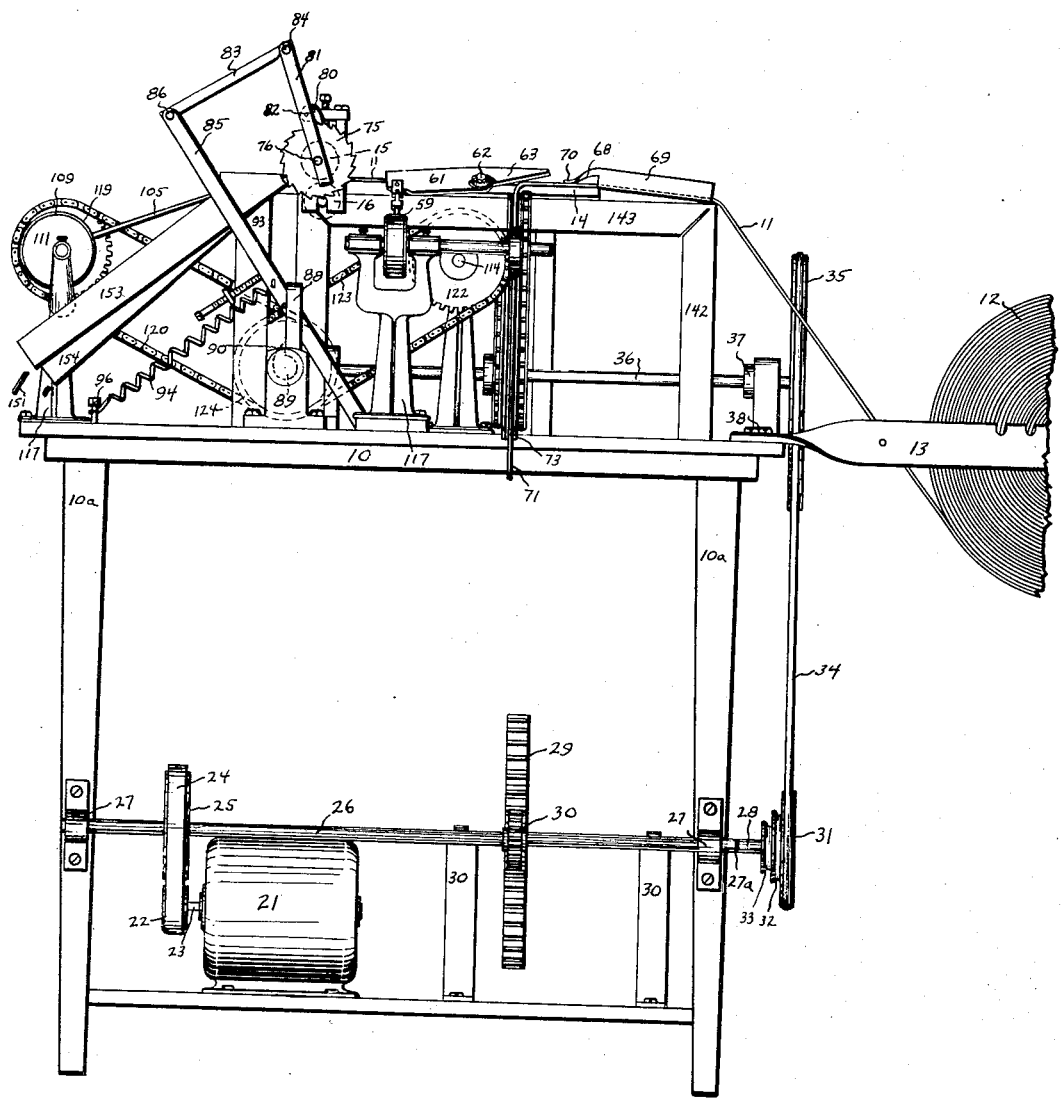
Figure 1 is a side elevation of the machine.

(See Figure 1.) An ordinary electric motor is indicated by the character 21. A small pulley 22 is attached to the motor shaft 23. A belt 24 drives the pulley 25, which is attached to the shaft 26, which shaft is journalled in the bearings 27.

It will be seen in Figure 1 that the shaft 26 terminates at 27a. A further shaft 28, which is directly behind the shaft 26 in Figure 1, is attached to the large gear 29, which is suitably journalled in the brackets 30.

This large gear 29 is driven by the small gear 30, which is pinned to the shaft 26. The pulley 31 is attached to the end of the shaft 28 and is provided with the speed increasing steps 32 and 33.

A belt 34 drives the upper pulley 35 which is attached to the shaft 36, which shaft is journalled in the bearings 37, and 37a.

The bearing 37 is secured to the upper bed 10 by means of screws at 38.

(See Figure 2.) The shaft 36 drives the sprockets 37 and 38 and also the bevel gear 39. The bevel gear 39 drives the further bevel gear 40, which in turn drives the bevel gear 41. The bevel gear 41 is attached to the shaft 42, which is suitably journalled in the bearing 43, which is attached to the bed plate 10 by the screws 44; and the bearing 43a.

Pinned to the outer end of the shaft 36 is the cam 45, the purpose of which will be explained later.

The sprocket 38 drives another sprocket 46 by means of the sprocket chain 47.

The sprocket 46 is attached to the shaft 48. The shaft 48 is attached to the cam 49. The cam 49 carries a ring 50 about its periphery.

(See Figure 3.) The shaft 48 is attached off-center on the cam 49, and the ring 50 is attached to a rod 51, which is attached to the shear 52 by means of a pivoted joint 53.

The shear 52 is pivoted by means of a cap nut at 54.

The sprocket 37 drives the sprocket 55 by means of the sprocket chain 56.

The sprocket 55 is attached to the shaft 57, which shaft is attached off-center to the cam 58. The cam 58 also carries the ring 59, which ring is attached to the rod 60, which rod is attached to the shear 61 at the pivotal connection 62.

In the position as shown in Figure 2, it will be seen that the cams 49 and 58 have pulled the rods 51 and 60 outwardly and that the shears 52 and 61 as shown, are in position ready to cut the strip 11.

The shear 61 is pivoted by means of another cap screw 62.

The forward end of the shears are tapered and beveled as at 63. The shape of the shears at this point is more clearly shown in Figures 8 and 9.

The shaft 48 is suitably journalled at 64, and the shaft 57 is journalled at 65.

It will be seen that as the cams 49 and 58 rotate, they will force the rods 51 and 50 inwardly and the outer extremities of the shears 52 and 61 at 63 outwardly.

As shown in Figure 8, as the shears travel outwardly, at this point, by virtue of their angled arrangement as at 66 and 67, these shears will cut the rubber strip 11 at the same angle as shown, since the bed 14 is tapered to coincide exactly with the movement of the shears.

A small spring lip 68 is bent down from the trough 69 so that it firmly presses against the rubber strip at 70 to provide a firm positioning of the strip when it is cut by the shears.

As the shears cut the scrap material away, this scrap material will form in a long continuous strip of rubber, which is shown by the characters 71 and 72. These strips will fall into the troughs 73 and 74 and will be carried away by these troughs.

It will be seen that after the strip 11 passes these shears 52 and 61, that it enters between the rollers 15 and 16 with its outer edges beveled.

The roller 15 is driven by means of the ratchet 75. The ratchet 75 is attached to the roller by means of the shaft 76 to which it is secured.

The other end of the shaft 76 terminates in the gear 77 which drives a lower gear 78, (see Figure 3), which gear in turn is pinned to the shaft 79 which is the shaft of the roller 16.

The rollers are moved step by step by means of the engagement of the pawl 80, which pawl is pinned to the arm 81 at 82.

The distance between the teeth on the ratchet 75 is equal to the width of a finished square patch plus a small additional amount on each side for waste.

The arm 81 is pinned to the arm 83 at 84, and the arm 83 is pinned to the arm 85 at 86, and the arm 85 is pinned to the base 10 between the brackets 87 by means of the pin 87a.

The member 88 is attached to the arm 86 in the position shown.

The cam 89 is attached to the shaft 42 and is of the shape as indicated in Figure 1 with an extending lip at 90 adapted to strike against the lower portion of 88 as the cam is rotated in a clock-wise direction.

It will be seen that when the lip 90 strikes this portion 88, that the entire arrangement of arms 85, 83 and 81 will be thrown forwardly, since the arm 85 is pivoted at its lowest portion. This position is shown by the dotted lines in Fig. 7.

The engagement of the pawl 80 with the ratchet 75 will then cause the roll 15 to be rotated, at the same time driving the roll 16 in the opposite direction by means of the engagement of the gears 77 and 78.

By virtue of the movement of these rolls in opposite directions and the spring tension applied against the upper roll, it will be seen that the strip 11 will be then forced between the rolls in successive movements.

An adjusting screw 91 is threadably secured by means of the member 92, which is attached to the bracket 93.

To provide the proper tension necessary to pull the entire arrangement back in position between successive movements, the spring 94 is provided and is attached to the arm 85 through an opening 95 at one end and to the base by means of the screw 96 at the other end.

Since the shaft 42 is driven from the beveled gear 41, which is the same size as the beveled gear 39, and these two beveled gears are driven from a common beveled gear 40, it will be seen that the speed of the shaft 42 will be the same speed as that of the shaft 36 so that the ratchet mechanism will move with perfect synchronization with respect to the shears 52 and 61. The same will be also true of the shears now to be described.

After the strip 11 passes between the rolls 15 and 16, it is ready for the next operation which will now be described.

After the strip 11 passes these rolls, it passes onto the bed plate 97. This plate is tapered on both sides at 98 and 99. (See Figure 9.)

A pair of shears 100 and 101 which are pivotally mounted by means of the cap screws 102 and 103, are arranged to shear along the surfaces 98 and 99.

These shears include the tapered, extended, and beveled portions 104.

These shears are driven by means of the rods 105 and 106 which are pivotally secured to the shears at 107 and 108, and the end of these rods are secured to the rings 109 and 110, which rings pass about cams 111 and 112.

These cams are off-center of their shafts 113 and 114, which shafts are journalled in the bearings 115 and 116 respectively.

These bearings are mounted suitably in brackets such as 117, which are secured to the base by means of the cap screws 118.

It will be noted that all of the cams are mounted on similar brackets 117.

The shaft 113 is driven by means of the sprocket 119 which is driven through the sprocket chain 120, passing over the other sprocket 121, which sprocket is secured to the shaft 42.

The shaft 114 is driven by means of the sprocket 122, which sprocket is driven by means of the sprocket chain 123, which is further driven by means of the sprocket 124. (See Figure 1 and Figure 4.)

The sprocket 124 is secured to the shaft 42.

It will now be seen that the shears 100 and 101 will operate the same as 52 and 61 and that they are driven at the same speed.

(See Figure 5.) The bed plate 97 is provided with an extension 125, upon which the ejector plate 126 moves. The ejector plate 126 reciprocates back and forth within the rectangular groove 127, and this ejector plate is made of the proper cross section so that it provides a flush surface on the top of the bed plate.

The ejector plate 126 includes the lengthened slot 128, and the slot 128 receives the machine screw 129, which is screwed into the extended portion 125, and the head of this screw is elevated slightly above the upper surface of the plate 126, and the screw acts as a guiding means to prevent the plate from being thrown out of its groove vertically.

The plate 126 is pinned at 130 to the member 131, which is pinned at 132 to the tongue 133, which tongue is pinned at 134 to the yoke 135. The yoke 135 is pinned to the arm 136. (See Figure 3.)

The arm 136 is pivoted at its lowest end at 137 to the bracket 138 which is secured to the base 10.

A spring 139 is secured through the arm 136 through the opening 140, and the other end of this spring is suitably secured at its lower end to one of the vertical supporting members such as 141.

Other supporting members are 142 and the horizontal member 143, which are merely any form of frame works for supporting the various mechanisms as is well known in the art.

It will be seen that the cam 45, which has the extended portion 144 and which cam is pinned to the shaft 46, will provide means for reciprocating the ejector plate 126 back and forth in its groove through the co-action of the various arms which are connected to this plate.

(See Figure 3 and Figure 6.) When this cam is in the dotted position as indicated by the character 145, it will be seen that the arm 136 will be thrown back to the position shown by the dotted lines at 146. The plate 126 will then be thrown backwardly out of the groove. Likewise when the cam is in the position as shown in the solid lines in Figure 6, the spring 139 will draw the arm 136 forwardly again and the ejector plate 126 will be pushed forwardly in its groove.

The rubber strip 11 passes beneath the spring clip 147 which is clamped beneath the base 97 by means of the extended portion 148 and secured by the countersunk screws 149.

As the strip 11 passes beneath this spring clip, it serves to hold it in place and passes up an inclined slope 99 and when in the position shown by the dotted lines at 150, the strip is ready for the cutting operation.

The shears 100 and 101 are at this point forced inwardly at their outer ends by means of the cams described, and the tapered ends 104 are then spread apart as shown in Figure 9 and the bevels on the other two sides of the patch are then cut, leaving the square patch perfectly formed.

Directly after this cutting operation has taken place, the ejector plate 126 will start to move backwardly. At this time the finished patch 151, which has been cut on top of this plate, will move backwardly with the ejector plate. However as soon as this plate is moved backwardly a small distance, since the shears 100 and 101 are still close together at their outer ends, namely where they are pivoted at 107 and 108, the patch 151 will then be retained by means of these shear portions and as the ejector plate 126 continues to move backwardly, the patch will drop down into the square groove 127.

Then as the ejector plate 126 moves forwardly again in the next cycle of operations, the end of this plate 152 will strike against one edge of the patch and will force it out of the groove 127 into the discharge chute 153 where it will be carried downwardly by gravity and the finished patch will then drop into a convenient receptacle.

The scrap cut from the outer edge of the bevel will pass down through an additional chute 154, which is directly in line with the movement of the strip 11.

As soon as the ejector plate 126 is moved to its furtherest forward position, it is then again in position for cutting and will fill the entire length of the groove 127, and the cutting operation will again take place.

It will be understood that the various cams and cam motions are timed to perform the cutting operations in their proper order as well as the discharge of the finished patches.

It will be understood also that the best way to obtain this result is to gear and drive all of the drive shafts at the same speed.

It will be seen that I have provided an apparatus which forms a satisfactory beveled edge on square rubber tire patches, overcoming difficulties usually encountered in rubber.

It will be also seen that I have provided a bevel cutting machine which enables patches to be cut from lengthened strips thereby eliminating a great deal of waste.

It will also be seen that I have provided a machine for beveling such patches which is of comparatively simple and durable construction and which is synchronized so as to perform its functions in the best possible manner.

It will be finally seen that I have provided such a machine which is entirely automatic and will perform its duties without constant attendance to its movable parts.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. The method of beveling the edges of square rubber tire patches which comprises the following steps; first shearing a lengthened strip of rubber in motion to provide a beveled edge lengthwise of the strip, and thence shearing the strip at right angles to its direction of motion while the strip is at rest to provide beveled edges on the other edges.

2. The method of making and beveling the edges of square rubber tire patches which comprises the following steps; feeding a lengthened strip of rubber in successive steps, shearing the strip along its edges thereby beveling the edges, shearing the strip at right angles to its direction of motion while the strip is at rest to provide beveled edges, and discharging the finished patch.

3. In a square patch beveling machine, a shearing bed, a reel from which strip rubber is guided over the bed, and a plurality of shears, a first pair of which are positioned to form a beveled edge lengthwise of the strip and a last pair of which are positioned to form a beveled edge at right angles to the lengthened strip.

4. In a square patch beveling machine, a shearing bed, a reel from which strip rubber is guided over the bed, and a plurality of shears, a first pair of which are positioned to form a beveled edge lengthwise of the strip and a last pair of which are positioned to form a beveled edge at right angles to the lengthened strip, and a pair of rollers between which the strip travels.

5. In a square patch beveling machine, a shearing bed, a reel from which strip rubber is guided over the bed, and a plurality of shears, a first pair of which are positioned to form a beveled edge lengthwise of the strip and a last pair of which are positioned to form a beveled edge at right angles to the lengthened strip, a pair of rollers between which the strip travels, and a ratchet attached to one of the rollers, and driving means for the ratchet comprising a pawl and an arm to which the pawl is pivotally secured.

6. In a square patch beveling machine, a shearing bed, a reel from which strip rubber is guided over the bed, and a plurality of shears, a first pair of which are positioned to form a beveled edge lengthwise of the strip and a last pair of which are positioned to form a beveled edge at right angles to the lengthened strip, a pair of rollers between which the strip travels, and a ratchet attached to one of the rollers, and driving means for the ratchet comprising a pawl and an arm to which the pawl is pivotally secured, and driving means for the arm comprising further pivotally secured arms, a cam bearing against one of the arms, a shaft to which the cam is attached and a motor driving the shaft.

7. In a square patch beveling machine, shearing beds, a reel from which strip rubber is guided over the beds, and a plurality of shears, a first pair of which are positioned to form a beveled edge lengthwise of the strip and a last pair of which are positioned to form a beveled edge at right angles to the lengthened strip, and driving means for the shears comprising a plurality of off-center cams, a shaft attached to the cams, and a motor driving the shaft.

8. In a square patch beveling machine, shearing beds, a reel from which strip rubber is guided over the beds, and a plurality of shears, a first pair of which are positioned to form a beveled edge lengthwise of the strip and a last pair of which are positioned to form a beveled edge at right angles to the lengthened strip, and driving means for the shears comprising a plurality of off-center cams, a shaft attached to the cams, and a motor driving the shaft, and a plurality of rings positioned to each engage its driving cam about the periphery of the cam, and driving rods attached to the rings and the shears.

9. In a square patch beveling machine, shearing beds, a reel from which strip rubber is guided over the beds, and a plurality of shears, a first pair of which are positioned to form a beveled edge lengthwise of the strip and a last pair of which are positioned to form a beveled edge at right angles to the lengthened strip, and driving means for the shears comprising a plurality of off-center cams, a shaft attached to the cams, and a motor driving the shaft, and a plurality of rings positioned to each engage its driving cam about the periphery of the cam, and driving rods attached to the rings and the shears, said shears being pivotally positioned outside of and adjacent the shearing edge of the bed.

10. In a square patch beveling machine, shearing beds, a reel from which strip rubber is guided over the beds, and a plurality of shears, a first pair of which are positioned to form a beveled edge lengthwise of the strip and a last pair of which are positioned to form a beveled edge at right angles to the lengthened strip, and driving means for the shears comprising a plurality of off-center cams, a shaft attached to the cams, and a motor driving the shaft, and a plurality of rings positioned to each engage its driving cam about the periphery of the cam, and driving rods attached to the rings and the shears, said shears being pivotally positioned outside of and adjacent the shearing edge of the bed, the driving rods being pivotally attached to the outer ends of the shears and beveled tapered inner ends of the shears providing cutting edges.

11. In a square patch beveling machine, a shearing bed, a reel from which strip rubber is guided over the bed, and a plurality of shears, a first pair of which are positioned to form a beveled edge lengthwise of the strip and a last pair of which are positioned to form a beveled edge at right angles to the lengthened strip, and means for discharging the patches thus formed comprising an ejector plate positioned beneath the last pair of shears and substantially parallel thereto.

12. In a square patch beveling machine, a shearing bed, a reel from which strip rubber is guided over the bed, and a plurality of shears, a first pair of which are positioned to form a beveled edge lengthwise of the strip and a last pair of which are positioned to form a beveled edge at right angles to the lengthened strip, and a pair of rollers between which the strip travels, and tension means applied between the rolls and against the strip comprising a bracket in which the rolls are mounted, and a spring mounted in the bracket and above and against the rolls.

13. In a square patch beveling machine, a shearing bed, a reel from which strip rubber is guided over the bed, and a plurality of shears, a first pair of which are positioned to form a beveled edge lengthwise of the strip and a last pair of which are positioned to form a beveled edge at right angles to the lengthened strip, a pair of rollers between which the strip travels, and a ratchet attached to one of the rollers, and driving means for the ratchet comprising a pawl and an arm to which the pawl is pivotally secured, and driving means for the arm comprising further pivotally secured arms, a cam bearing against one of the arms, a shaft to which the cam is attached and a motor driving the shaft, and means for discharging the patches thus formed comprising an ejector plate, a groove in the shearing bed beneath the said pair of shears which receives the ejector plate, and cam driven means for imparting reciprocating movement to the ejector plate.

14. In a square patch beveling machine, a shearing bed, a reel from which strip rubber is guided over the bed, and a plurality of shears, a first pair of which are positioned to form a beveled edge lengthwise of the strip and a last pair of which are positioned to form a beveled edge at right angles to the lengthened strip, a pair of rollers between which the strip travels, and a ratchet attached to one of the rollers, and driving means for the ratchet comprising a pawl and an arm to which the pawl is pivotally secured, and driving means for the arm comprising further pivotally secured arms, a cam bearing against one of the arms, a shaft to which the cam is attached and a motor driving the shaft, and means for discharging the patches thus formed comprising an ejector plate, a groove in the shearing bed beneath the said pair of shears which receives the ejector plate, and cam driven means for imparting reciprocating movement to the ejector plate, comprising an arm to which the ejector plate is pivotally secured, a cam positioned to bear against the arm, a spring attached between the arm and a lower point of the machine, a shaft to which the cam is attached, and a motor to drive the shaft.

15. In a square patch beveling machine, shearing beds, a reel from which strip rubber is guided over the beds, and a plurality of shears, a first pair of which are positioned to form a beveled edge lengthwise of the strip and a last pair of which are positioned to form a beveled edge at right angles to the lengthened strip, and driving means for the shears comprising a plurality of off-center cams, a shaft attached to the cams, and a motor driving the shaft, said last pair of shears being driven from shafts disposed at right angles to the shaft driving the first pair of shears, and beveled gears providing driving means between the shafts.

16. In a square patch beveling machine, shearing beds, a reel from which strip rubber is guided over the beds, and a plurality of shears, a first pair of which are positioned to form a beveled edge lengthwise of the strip and a last pair of which are positioned to form a beveled edge at right angles to the lengthened strip, and driving means for the shears comprising a plurality of off-center cams, a shaft attached to the cams, and a motor driving the shaft, and a plurality of rings positioned to each engage its driving cam about the periphery of the cam, and driving rods attached to the rings and the shears, and means for discharging the patches thus formed comprising an ejector plate, a groove in the shearing bed beneath the last pair of shears which receives the ejector plate, and cam driven means for imparting reciprocating movement to the ejector plate.

17. In a square patch beveling machine, shearing beds, a reel from which strip rubber is guided over the beds, and a plurality of shears, a first pair of which are positioned to form a beveled edge lengthwise of the strip and a last pair of which are positioned to form a beveled edge at right angles to the lengthened strip, and driving means for the shears comprising a plurality of off-center cams, a shaft attached to the cams, and a motor driving the shaft, and a plurality of rings positioned to each engage its driving cam about the periphery of the cam, and driving rods attached to the rings and the shears, and means for discharging the patches thus formed comprising an ejector plate, a groove in the shearing bed beneath the last pair of shears which receives the ejector plate, and cam driven means for imparting reciprocating movement to the ejector plate, comprising an arm to which the ejector plate is pivotally secured, a cam positioned to bear against the arm, a spring attached between the arm and a lower part of the machine, a shaft to which the cam is attached, and a motor to drive the shaft.

18. In a square patch beveling machine, shearing beds, a reel from which strip rubber is guided over the beds, and a plurality of shears, a first pair of which are positioned to form a beveled edge lengthwise of the strip and a last pair of which are positioned to form a beveled edge at right angles to the lengthened strip, and driving means for the shears comprising a plurality of off-center cams, a shaft attached to the cams, and a motor driving the shaft, and a plurality of rings positioned to each engage its driving cam about the periphery of the cam, and driving rods attached to the rings and the shears, and means for discharging the patches thus formed comprising an ejector plate, a groove in the shearing bed beneath the last pair of shears which receives the ejector plate, and cam driven means for imparting reciprocating movement to the ejector plate, comprising an arm to which the ejector plate is pivotally secured, a cam positioned to bear against the arm, a spring attached between the arm and a lower part of the machine, a shaft to which the cam is attached, and a motor to drive the shaft, and means for receiving the finished patches and scraps cut away, comprising a pair of chutes positioned in the line of movement of the scraps and patches to receive and guide the same.

19. In a square patch beveling machine, a pair of shearing beds disposed at right angles to each other, a reel from which strip rubber is guided over the beds, and a plurality of shears, a first pair of which are positioned to form a beveled edge lengthwise of the strip, and a last pair of which are positioned to form a beveled edge at right angles to the lengthened strip, each of the pairs of shears arranged to shear across tapered extensions of the shearing beds, and driving means for the shears comprising a plurality of driven off center cams, rings enclosing the periphery of the cams, and rods attached between the rings and shears, and discharge means for ejecting the patches comprising an ejector plate, a groove in the shearing bed beneath the last pair of shears which receives the ejector plate and means for imparting reciprocating movement to the ejector plate comprising an arm to which the ejector plate is pivotally secured, a cam positioned to bear against the arm, tension means between the arm and the machine, and the movement of the ejector plate arranged so that the plate is beneath a patch when it is cut.

CLARENCE E. DUNLAP.